United States Patent
Solanki et al.

(10) Patent No.: US 10,783,877 B2
(45) Date of Patent: Sep. 22, 2020

(54) WORD CLUSTERING AND CATEGORIZATION

(71) Applicant: ACCENTURE GLOBAL SOLUTIONS LIMITED, Dublin (IE)

(72) Inventors: Anshul Solanki, Gurgaon (IN); Akanksha Juneja, Dwarka (IN); Bibudh Lahiri, Noida (IN); Anurag Tripathi, Noida (IN); Sonam Gupta, Meerut (IN); Rinki Arya, Meerut (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 182 days.

(21) Appl. No.: 16/044,031

(22) Filed: Jul. 24, 2018

(65) Prior Publication Data

US 2020/0035229 A1    Jan. 30, 2020

(51) Int. Cl.
| | |
|---|---|
| *G06N 3/00* | (2006.01) |
| *G06F 17/00* | (2019.01) |
| *H04M 3/527* | (2006.01) |
| *H04M 3/493* | (2006.01) |
| *G10L 15/18* | (2013.01) |
| *G06K 9/62* | (2006.01) |
| *G10L 15/10* | (2006.01) |
| *G10L 15/22* | (2006.01) |
| *G10L 15/26* | (2006.01) |

(52) U.S. Cl.
CPC ........ *G10L 15/1822* (2013.01); *G06K 9/6223* (2013.01); *G10L 15/10* (2013.01); *G10L 15/22* (2013.01); *G10L 15/26* (2013.01)

(58) Field of Classification Search
CPC . G06F 17/30976; G06F 17/289; G06F 17/285
See application file for complete search history.

(56) References Cited

U.S. PATENT DOCUMENTS

| | | | |
|---|---|---|---|
| 8,675,829 B1* | 3/2014 | Coughlan | H04M 3/53366 379/88.08 |
| 9,858,923 B2* | 1/2018 | Wasserblat | G10L 15/063 |
| 10,366,151 B1* | 7/2019 | Mertens | G06F 40/166 |
| 2009/0043749 A1* | 2/2009 | Garg | G06F 16/3338 |
| 2014/0279993 A1* | 9/2014 | Bernhardt | G06F 16/951 707/706 |
| 2014/0303960 A1* | 10/2014 | Orsini | G06F 40/253 704/2 |

(Continued)

*Primary Examiner* — Anne L Thomas-Homescu
(74) *Attorney, Agent, or Firm* — Mannava & Kang, P.C.

(57) ABSTRACT

A system for categorizing words into clusters includes a receiver to receive a set of sentences formed by a plurality of words. The set of sentences is indicative of interaction of a user with a virtual assistant. A categorizer categorizes the plurality of words into a first set of clusters by using a first clustering technique, and categorizes the plurality of words into a second set of clusters by using a second clustering technique. A detector detects words that appear in similar clusters after categorization by the first clustering technique and the second clustering technique. Similarity of clusters is based on a nature of words forming the clusters. A generator generates a confidence score for each of the plurality of words based on the detection. The confidence score of a word is indicative of accuracy of the categorization of the word.

18 Claims, 9 Drawing Sheets

(56) References Cited

U.S. PATENT DOCUMENTS

| | | | |
|---|---|---|---|
| 2015/0066479 A1* | 3/2015 | Pasupalak | G06F 40/40 |
| | | | 704/9 |
| 2016/0259863 A1* | 9/2016 | Allen | G06F 16/90332 |
| 2017/0034107 A1* | 2/2017 | Krishnaswamy | G06F 40/169 |
| 2017/0097966 A1* | 4/2017 | Kozareva | G06Q 30/02 |
| 2017/0118336 A1* | 4/2017 | Tapuhi | G06F 16/3329 |
| 2018/0137099 A1* | 5/2018 | Allen | G06F 40/253 |
| 2018/0137102 A1* | 5/2018 | Allen | G06F 40/242 |
| 2019/0164245 A1* | 5/2019 | Takacs | G06F 16/353 |
| 2019/0182382 A1* | 6/2019 | Mazza | G10L 15/16 |
| 2019/0188590 A1* | 6/2019 | Wu | G06F 16/24575 |
| 2019/0251417 A1* | 8/2019 | Bennett | G06F 40/00 |
| 2019/0311036 A1* | 10/2019 | Shanmugam | H04L 51/02 |
| 2019/0394238 A1* | 12/2019 | Putz | G06Q 10/0637 |
| 2020/0004878 A1* | 1/2020 | Beaumont | G06F 16/685 |
| 2020/0005117 A1* | 1/2020 | Yuan | G06Q 30/0201 |
| 2020/0012720 A1* | 1/2020 | Elson | G06F 16/322 |

* cited by examiner

WORD CLUSTERING AND CATEGORIZATION

TECHNICAL FIELD

The present disclosure relates to virtual assistance and, in particular, relates to systems and methods for interaction between a virtual assistant and a user.

BACKGROUND

With the advent of new technology, a majority of service providers are increasingly using virtual assistants for interaction with a consumer. For example, there are automated kiosks in banks that are designed to interact with consumers. The automated interaction between a consumer and a system may reduce the need for human service agents.

Currently, there are interactive robotic systems that directly interact with a consumer in order to understand their concerns, and then resolve the concerns accordingly. However, given the wide range of languages that can be used by the consumer to interact with a robotic system, there exists a distinct possibility of miscommunication between the robotic system and the consumer. For example, considering the variation in dialects used and the pronunciation of every individual, the robotic system may not be able to understand the consumers' concerns correctly. Consequently, the concerns cannot be addressed and resolved as well. This supposedly poor customer service may lead to frustration and dissatisfaction in consumers that may affect the market share of the service provider.

SUMMARY

In an example embodiment of the present disclosure, a system for categorizing words into clusters is disclosed. The system includes a receiver, a categorizer in communication with the receiver, a detector in communication with the categorizer, and a generator in communication with the detector. The receiver receives a set of sentences formed by a plurality of words. The set of sentences is indicative of interaction of a user with a virtual assistant. The user interacts with the virtual assistant through at least one of e-mails, chat messages, a web service, and an Interactive Voice Response (IVR). Further, the categorizer categorizes the plurality of words into a first set of clusters by using a first clustering technique, and categorizes the plurality of words into a second set of clusters by using a second clustering technique. The first clustering technique and the second clustering technique form the first set of clusters and the second set of clusters, respectively, based on similarities in at least one of spellings, pronunciations, and meanings of the plurality of words. The detector may detect words that appear in similar clusters after categorization by the first clustering technique and the second clustering technique. Similarity of clusters is based on a nature of words forming the clusters. The generator generates a confidence score for each of the plurality of words based on the detection. The confidence score of a word is indicative of accuracy of the categorization of the word.

In another example embodiment of the present disclosure, a system for interacting with a user is disclosed. The system includes a receiver, a detector in communication with the receiver, a determinator in communication with the detector, a selector in communication with the determinator, a replacer in communication with the selector, and a transmitter in communication with the replacer. The receiver receives at least one instruction from the user in form of a sentence. The at least one instruction is received through at least one of an e-mail, a chat message, a web service, and an Interactive Voice Response (IVR). The detector detects a word from the sentence that is not understandable to the system. The determinator determines a cluster of words, from among predefined clusters of words, that relates to the detected word. The predefined clusters of words are formed by categorization of a plurality of words based on similarities in at least one of spellings, pronunciations, and meanings of the plurality of words. Further, the selector selects at least one word from the cluster that relates to the detected word, based on a confidence score of the at least one word. A confidence score of a word is indicative of accuracy of the categorization of the word. The replacer replaces the word with the at least one word to form a new sentence. The transmitter may then transmit the new sentence to the user for confirmation of accuracy of the new sentence, and interact with the user in response to the new sentence, based on the confirmation.

In yet another example embodiment of the present disclosure, a computer-implemented method, for categorizing words into clusters, executed by at least one processor, is disclosed. The method commences with receiving a set of sentences formed by a plurality of words. The set of sentences is indicative of interaction of a user with a virtual assistant. The user interacts with the virtual assistant through at least one of e-mails, chat messages, a web service, and an Interactive Voice Response (IVR). The method includes categorizing the plurality of words into a first set of clusters by using a first clustering technique, and categorizing the plurality of words into a second set of clusters by using a second clustering technique. The first clustering technique and the second clustering technique form the first set of clusters and the second set of clusters, respectively, based on similarities in at least one of spellings, pronunciations, and meanings of the plurality of words. Further, the method includes detecting words that appear in similar clusters after categorization by the first clustering technique and the second clustering technique. Similarity of clusters is based on nature of words forming the clusters. The method then includes generating a confidence score for each of the plurality of words based on the detection. The confidence score of a word is indicative of accuracy of the categorization of the word.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
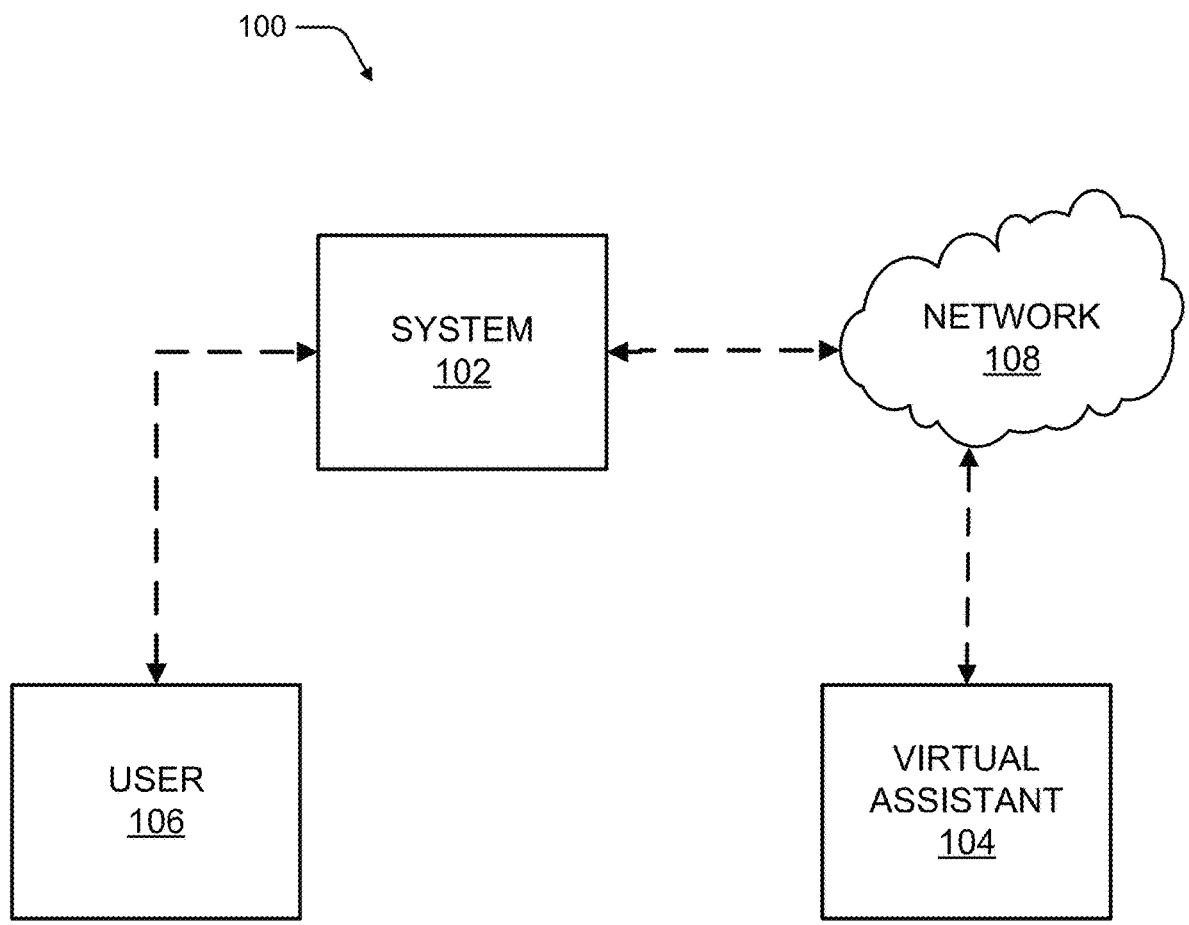
FIG. 1 illustrates an environment for implementation of a system for interaction between a virtual assistant and a user, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

As is generally known, a virtual assistance system receives instructions or requests from a user, for example, through speech. Based on a request received from the user, the virtual assistance system provides the user with an appropriate response. One of ordinary skill in the art will appreciate that the virtual assistance system can provide the appropriate response to the user only when the request is correctly understood by the virtual assistance system. Therefore, accuracy and efficiency of the virtual assistance system are directly dependent on virtual assistance system understanding the user's request.

It is quite evident that human language is complicated and therefore, there exist reasonable possibilities of miscommunication owing to the wide range of variations in dialect, pronunciation, and regional slang words of every user. In the realm of virtually assisted conversations, the wide range of variations makes it difficult for the virtual assistant system to understand the user. Consequently, this becomes a hurdle for the virtual assistant system in the course of providing assistance to the user.

Moreover, existing virtual assistant systems do not offer an explanation to the user in case of any misunderstanding. Therefore, the virtual assistant system is not capable of informing of the user about a reason for the misunderstanding. As a result, once any portion of the user request is misunderstood, the virtual assistant system does not have any mechanism to eliminate the misunderstanding. In fact, after the misunderstanding, a conversation between the virtual assistance system and the user may gradually become more difficult as the conversation proceeds. This may lead to dissatisfaction of the user resulting in damage to the reputation of a service provider.

Further, resolution of concerns of the user becomes a time-intensive and cumbersome task causing inconvenience to the user as well as the service provider. Therefore, existing techniques of the virtual assistance systems are fragmented, time-intensive, inaccurate, expensive, and non-uniform.

The present subject matter describes systems and methods for assisting an interaction between a virtual assistant and a user. According to an example embodiment of the present disclosure, outcome of a system is two-fold, firstly, categorizing words into clusters and then assisting the interaction between the virtual assistant and the user based on the categorization.

For categorizing words into the clusters, the system may receive a set of sentences formed by a plurality of words. The set of sentences is indicative of interactions of the user with the virtual assistant. The user may interact with the virtual assistant through at least one of e-mails, chat messages, a web service, and an Interactive Voice Response (IVR).

Further, the system categorizes the plurality of words into a first set of clusters by using a first clustering technique, and categorizes the plurality of words into a second set of clusters by using a second clustering technique. The first clustering technique and the second clustering technique form the first set of clusters and the second set of clusters, respectively. The first set of clusters and the second set of clusters are formed based on similarities in at least one of spellings, pronunciations, and meanings of the plurality of words.

Following the formation of the first set of cluster and the second set of cluster, the system may detect words that appear in similar clusters after categorization by the first clustering technique and the second clustering technique. In an example embodiment, similarity of clusters is based on nature of words forming the clusters. Based on the detection, the system may generate a confidence score for each of the plurality of words. The confidence score of a word is indicative of accuracy of the categorization of the word.

Once confidence scores are generated, the system may receive at least one instruction from the user in form of a sentence. The at least one instruction may be received through at least one of an e-mail, a chat message, the web service, and the IVR. The system may detect a word from the sentence that is not understandable to the system, and may determine a cluster of words, from among the first set of clusters and the second set of clusters, that relates to the detected word. At least one word may be selected from the cluster that relates to the detected word, based on a confidence score of the at least one word.

Further, the system may replace the word with the at least one word to form a new sentence. The new sentence may then be transmitted to the user for confirmation of accuracy of the new sentence. Subsequently, the system may interact with the user in response to the new sentence, based on the confirmation.

One of ordinary skill in the art will appreciate that firstly, the system offers a comprehensive approach to classify the words into the clusters. By applying two clustering techniques and generating the confidence scores, an accuracy of classification is improved. Therefore, the interaction of the virtual assistant with the user is assisted by the system based on such accurately classified words.

The system of the present disclosure also ensures that the misunderstanding is communicated to the user by requesting for confirmation on an alternative word or phrase. As the system receives the confirmation from the user, the system simultaneously learns and improves with regard to understanding of subsequent interactions with the user as well. Further, before sharing such suggestions to the user, the system ensures that the suggestions are semantically and syntactically valid. This may improve the quality of the suggestions and consequently, offers a fruitful user experience. Moreover, the system informs the user of a reason for misunderstanding in the user request. This may allow the user to improve the communication on his/her part for subsequent interactions.

In an example embodiment, the system may provide the user with multiple options, in case of confusion with regard to a phrase or word used by the user. Therefore, the system eliminates the possibility of miscommunication before processing the user request. This would in turn result in a significant reduction in time spent in resolving a user concern. Consequently, cost associated with the assistance is reduced as well. Therefore, the present disclosure offers the system for assisting the interaction between the virtual assistant and the user that is comprehensive, accurate, time-efficient, convenient, and cost-effective.

FIG. 1 illustrates an environment 100 for implementation of a system 102 for interaction between a virtual assistant 104 and a user 106, according to an example embodiment of the present disclosure. Although the functionality of the system 102 is explained with regard to the virtual assistant 104 and the user 106, it will be appreciated by a person skilled in the art that the system 102 can be implemented in any other domain with minor modifications, without departing from the scope of the present disclosure.

A virtual assistant 104 may be an automated program that uses artificial intelligence techniques to provide online assistance to the user 106. The user 106 may provide an instruction to the virtual assistant 104 as a natural language input. In an example embodiment, the virtual assistant 104 may be one of a kiosk, a chat-bot, and a computer. Further, the virtual assistant 104 may be deployed in locations that may include, but are not limited to, banks, restaurants, airports, and tourist attractions. In an example embodiment, the system 102 may communicate with the virtual assistant 104 through a network 108. The system 102 may assist in facilitating the interaction between the virtual assistant 104 and the user 106.

Figure 2:
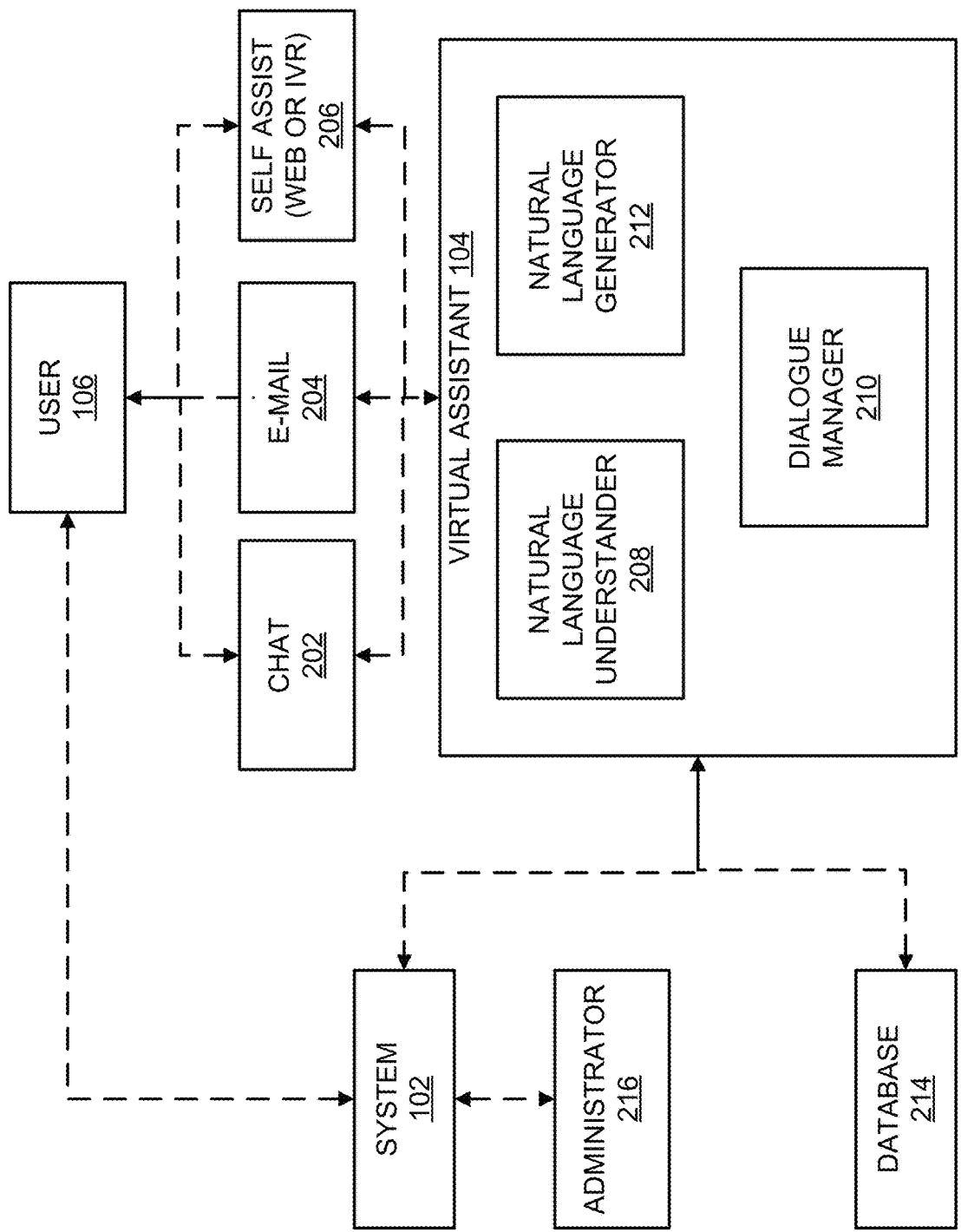
FIG. 2 illustrates another environment depicting an implementation of the system for the interaction between the virtual assistant and the user, according to an example embodiment of the present disclosure.

FIG. 2 illustrates another environment 200 depicting an implementation of the system 102 for the interaction between the virtual assistant 104 and the user 106, according to an example embodiment of the present disclosure. For the sake of brevity, features of the system 102 that are already explained in the description of FIG. 1 are not explained in detail in the description of FIG. 2. In FIG. 2, functioning of the system 102 is shown in form of a block flow diagram for better understanding of the present subject matter. The blocks or components shown in FIG. 2 may or may not be a part of the components as shown in FIG. 1, without departing from the scope of the disclosure.

As shown in FIG. 2, the user 106 and the virtual assistant 104 may interact with each other through at least one of chat messages 202, e-mails 204, a web service 206, and an Interactive Voice Response (IVR) 206. In an example embodiment, the virtual assistant 104 may include, but is not limited to, a Natural Language Understander (NLU) 208, a dialogue manager 210, and a Natural Language Generator (NLG) 212. The NLU 208, the dialogue manager 210, and the NLG 212 may be in communication with each other.

Each communication from the user 106 may pass through the NLU 208, the dialogue manager 210, and the NLG 212 for understanding of the communication, and in return generating a response to the communication. The NLU 208 may receive a request from the user 106 and may understand or interpret the request for the virtual assistant 104 for further processing. The constructional and operational features of the NLU 208 are explained in detail in the description of FIG. 3.

Figure 3:
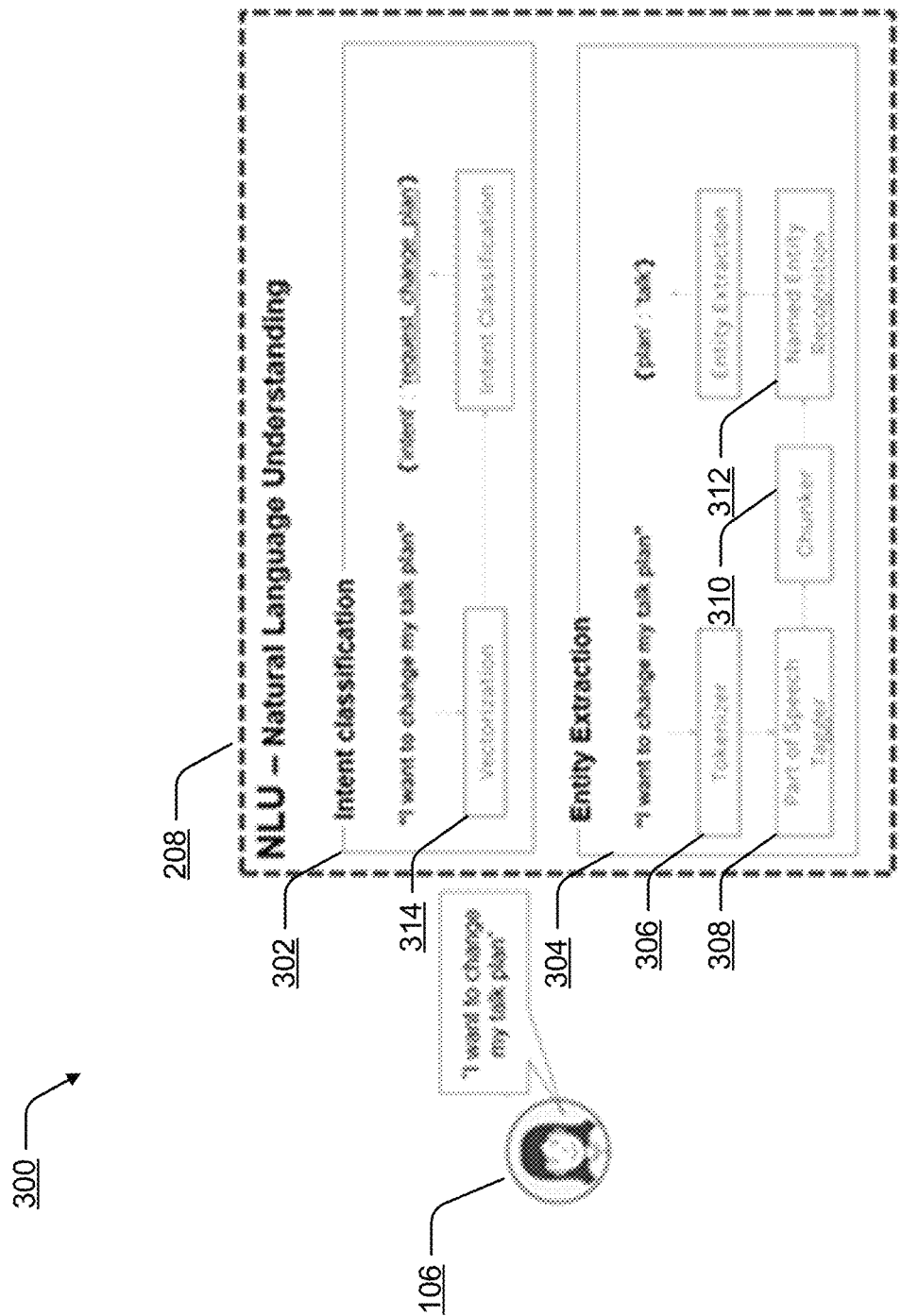
FIG. 3 illustrates a block diagram of a Natural Language Understander of the virtual assistant, according to an example embodiment of the present disclosure.

FIG. 3 illustrates a block diagram 300 of the NLU 208 of the virtual assistant, according to an example embodiment of the present disclosure. The NLU 208 may receive a sentence as the request from the user 106. For example, in the illustrated example embodiment, the sentence may be "I want to change my talk plan". Upon receiving the sentence, the NLU 208 may perform intent classification and entity extraction from the sentence. The intent classification and the entity extraction are indicated by blocks 302 and 304, respectively. An intent of the sentence may be understood as a requirement of the user. Further, an entity in the sentence may be understood as a piece of information to be considered by the virtual assistant 104 to appropriately respond to the user 106.

In the present example, for the intent classification, the NLU 208 may perform vectorization on the sentence as indicated by block 314, and classify the intent as {'intent': 'request_change_plan'}. Further, for the entity extraction, the NLU 208 may include, but is not limited to, a tokenizer 306, a part-of-speech tagger 308, a chunker 310, and a named entity recognition 312. In the present example, the NLU 208 may extract the entities from the sentence as {'plan':'talk'}. In an example embodiment, the NLU 208 may perform relationship extraction and sentimental analysis as well.

Further, the NLU 208 may employ a machine learning model for the intent classification and the entity extraction. The machine learning model may be based on a Conditional Random Field (CRF) technique. Followed by the intent extraction, the NLU 208 may generate a corpus of text tagged with one of more categories of intent. The machine learning model may be trained accordingly. After being trained, the machine learning model may categorize subsequent sentences into one of the categories of the intent.

Further, followed by the entity extraction, the NLU 208 may generate a labeled or tagged data set. The data set may mark and label the entities that can further be used by the virtual assistant 104 for processing of subsequent sentences. Another machine learning model may be trained based on the dataset. Subsequently, the machine learning model may learn to extract similar entities from sentences received henceforth. As would be gathered, the NLU 208 may employ the abovementioned machine learning models to process the received sentence, and generate structured data indicative of the identified intent and the extracted entities.

In an example embodiment, the NLU 208 may employ rule-based techniques including, but not limited to, regex features and entity synonyms for extraction of entities from sentences. For example, if an entity includes a certain structure, such as a phone number, the NLU 208 may use a regular expression for an easy detection of the entity. Further, the entity synonyms may be understood as keywords that may be defined as having the same value, for example, "data" and "Internet" are entity synonyms with respect to internet data plans.

In one example, when the sentence is "I want to book an Italian restaurant for 3 people", the NLU 208 may detect the intent and the entities as "food booking" and "cuisine→Italian, people→3", respectively. In another example, when the sentence is "I am looking for some Mexican food tonight with low budget for seven people", the NLU 208 may detect the intent and the entities as "food booking" and "cuisine→Mexican, people→7, budget—low", respectively. Further, when the sentence is "I am looking to throw a dinner party for 20 people", the NLU 208 may detect the intent as "food booking" and "people→20", respectively. The intent for the abovementioned sentences is "food booking" but the entities are different in each sentence.

Referring to FIG. 2, in an example embodiment, the NLU 212 may not understand the request received from the user 106, for example, due to presence of words in the request that are unknown to the NLU 212. In an example embodiment, the NLU 212 may generate a notification for an administrator 216. The administrator 216 may be a user agent qualified to address the request from the user 106. The administrator 216 may use specialized assisted tools to retrieve information from a database 214 that is relevant to the user request.

In an example embodiment, when the request received from the user 106 is not understood by the NLU 212, the NLU 212 may forward the request to the system 102. The system 102 may assist the interaction between the user 106 and the virtual assistant 104 for understanding the user request, and generating a corresponding response to the user request. The constructional and operational details of the system 102 are explained in detail in the description of FIG. 5.

Figure 4:
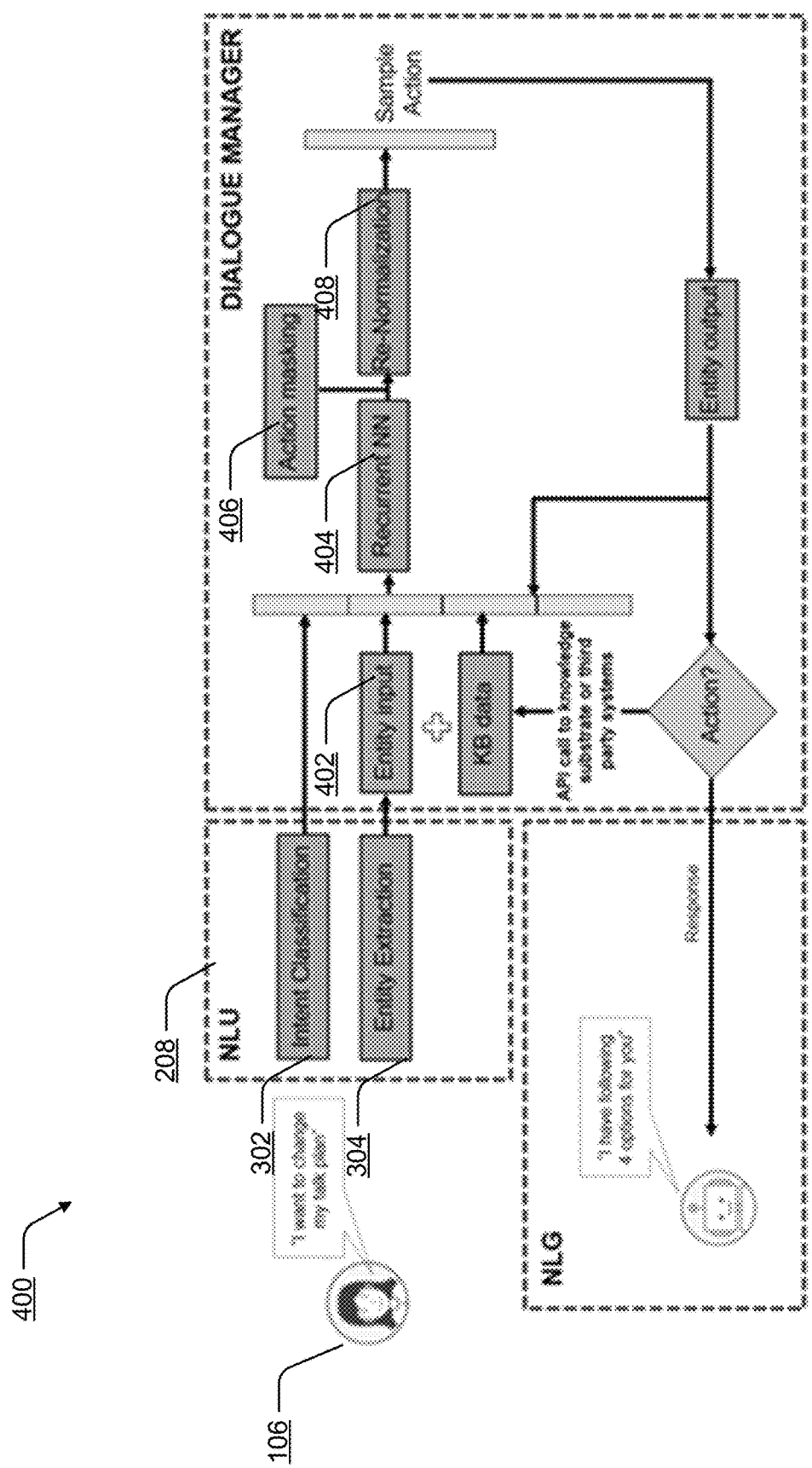
FIG. 4 illustrates a block diagram depicting functionality of a dialogue manager of the virtual assistant, according to an example embodiment of the present disclosure.

In an example embodiment, the NLU 208 may forward the processed sentence to the dialogue manager 210. FIG. 4 illustrates a block diagram 400 depicting functionality of the dialogue manager 210, according to an example embodiment of the present disclosure. The dialogue manager 210 may receive the sentence in from of structured input, i.e., in the form of intents and entities, from the NLU 208. Based on the structured input as indicated by a block 402, the dialogue manager 210 may determine an action to be taken by the virtual assistant 104. The dialogue manager 210 may determine the action based on historical records of previous conversations with the virtual assistant 104. In an example embodiment, the dialogue manager 210 may request for more information from the user 106.

Referring to FIG. 2, in another example embodiment, the dialogue manager 210 may retrieve details from the database 214 for generating a response to the user request. Therefore, the dialogue manager 214 may be in communication with the database 214. For example, the user 106 may request the virtual assistant 104 to book a restaurant. Once the virtual assistant 104 receives required information from the user, for example, cuisine, a location, a price range, and a number of people, the virtual assistant 104 may retrieve relevant information to respond to the user 106, from the database 214.

The database 214 may include, but is not limited to, information that can be requested by the user 106. Therefore, upon receiving a request from the user 106, the virtual assistant 104 may extract information from the database 214 and share the extracted information with the user 106. Further, the database 214 may include information pertaining to, but is not limited to, Customer Relationship Management (CRM), Enterprise Resource Planning (ERP), and social networking platforms. The database 214 may be an internal database or an external database.

Referring to FIG. 2 and FIG. 4, the dialogue manager 210 may use a machine learning model to determine next action to be taken by the virtual assistant 104 in response to the user request. The machine learning model may be trained on similar conversations that are curated and labeled by the NLU 208 for the extracted intents and the entities. In an example embodiment, the machine learning model may be based on a Recurrent Neural Network (RNN) technique, as indicated by a block 404. Since the RNN technique is known to perform better on sequential data and the interaction between the virtual assistant 104 and the user 106 is sequential, the machine learning may be based on the RNN technique.

In an example embodiment, an output or a prediction of the RNN technique may not be accurate. For example, the user 106 may request for a change in booking after the virtual assistant 104 has made the booking. However, if the RNN technique determines an action to be "update booking", when a prior booking has not been made, the dialogue manager 210 may detect that the output of the RNN technique as incorrect.

In such example embodiments, the dialogue manager 210 may perform action masking, as indicated by a block 406, to handle such erroneous prediction from the machine learning model. The action masking may include comparing the predicted action with a predefined list of actions for the virtual assistant 104. When, the predicted action is not a part of the predefined list of actions, the dialogue manager 210 may reject the predicted action.

In an example embodiment, the dialogue manager 210 may perform re-normalization of the predicted action, as indicated by a block 408, to normalize the predicted action in order to align it with the predefined list of actions. For example, the dialogue manager 210 may expect the RNN technique to predict values between 2.0 to 6.0. However, the RNN may predict a value to be 6.4. In such an example embodiment, the dialogue manager 210 may re-normalize by setting the value as 6.0.

Upon finalization of the action to be taken by the virtual assistant 104, the dialogue manager 210 may retrieve information from the database 214. The retrieved information may then be forwarded to the NLG 212. Further, the retrieve information may be forwarded to the machine learning model for subsequent determination of actions.

Upon determining the next action by the dialogue manager 210, the NLG 212 may generate a response for the user 106. The NLG 212 may perform content planning, i.e., what to say, and sentence realization, i.e., how to say it. In the present example embodiment, the dialogue manager 210 may perform the content planning by selecting a dialog act to generate. The dialogue act may include, but is not limited to, additional attributes, for example, slots and values that the virtual assistant 104 may request from the user 106.

In an example, the user 106 may request as "I want to change my talk plan". The dialogue manager 210 may determine an action as "Action_suggest_plans". Accordingly, the NLG 212 may generate a response as "I have following 4 options for you". The NLG 212 may generate a response that is coherent, meaningful, contextual, complete, non-repetitive and clear.

Figure 5:
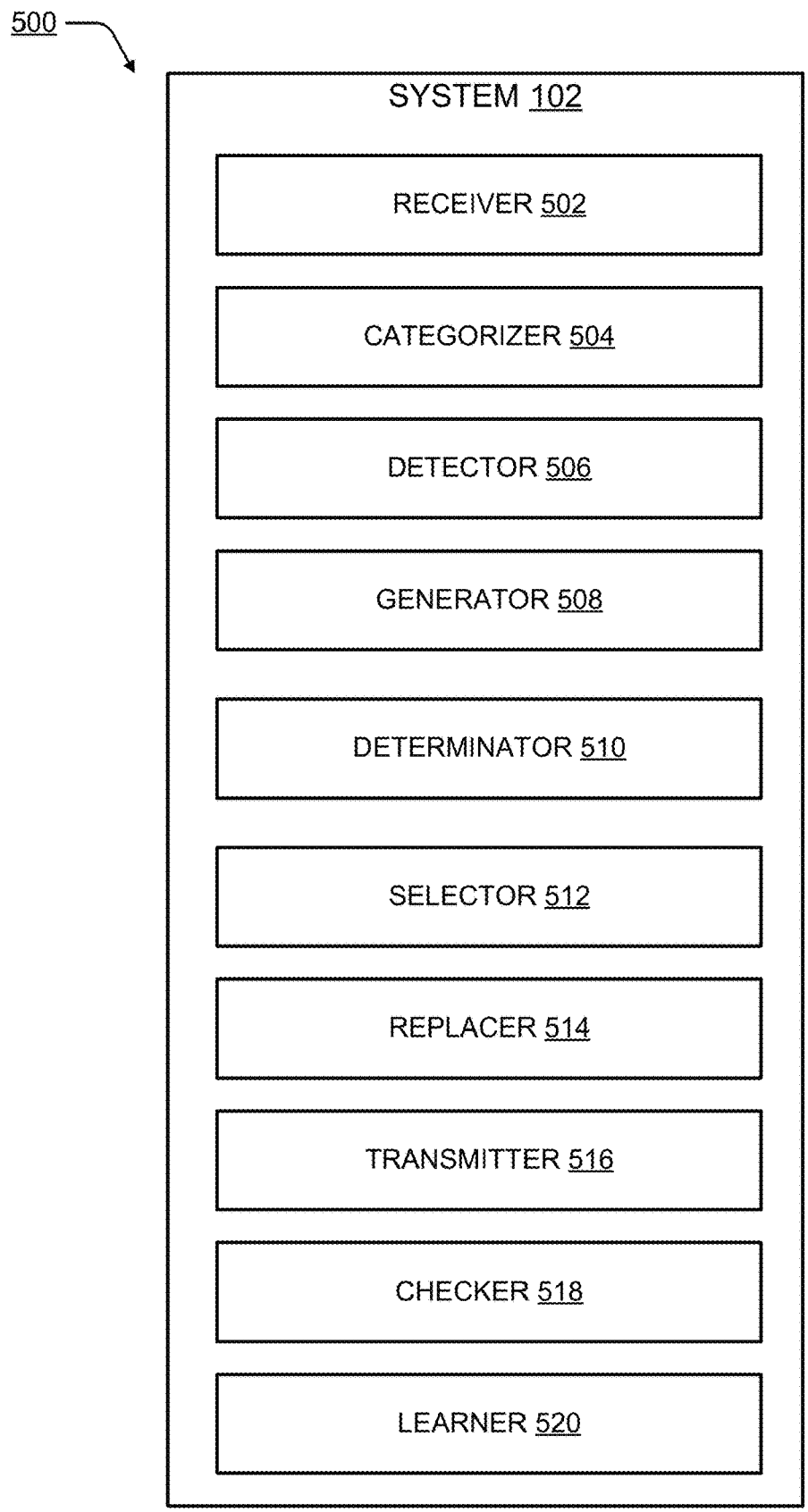
FIG. 5 illustrates a block diagram of the system, according to an example embodiment of the present disclosure.

FIG. 5 illustrates a block diagram 500 of the system 102, according to an example embodiment of the present disclosure. For the sake of brevity, constructional and operational features of the system 102 that are already explained in the description of FIG. 1 are not explained in detail in the description of FIG. 2.

In an example embodiment, for categorizing words into clusters, the system 102 may include a receiver 502, a categorizer 504, a detector 506, and a generator 508. The receiver 502, the categorizer 504, the detector 506, and the generator 508 may be in communication with each other.

The receiver 502 may receive a set of sentences formed by a plurality of words. The set of sentences is indicative of interactions of the user 106 with the virtual assistant 104. The user 106 may interact with the virtual assistant 104 through at least one of the e-mails 204, the chat messages 202, the web service 206, and the IVR 206.

Further, the categorizer 504 may categorize the plurality of words into a first set of clusters by using a first clustering technique. In an example embodiment, the first clustering technique may include, but is not limited to, a K-means clustering technique. Each cluster may include semantically similar words.

In an example embodiment, before the application of K-means clustering technique, the plurality of sentences may be processed and corresponding features may be computed by using a Term Frequency-Inverse Document Frequency (TF-IDF) technique and a Latent Semantic Indexing (LSI) technique.

The TF-IDF technique is a numerical statistic that is intended to reflect how important a word is to a document in a collection or corpus. The TF-IDF technique is often used as a weighting factor in searches of information retrieval, text mining, and user modeling. A TF-IDF value may increase in a direct proportion to a number of appearances of a word in the document. Further, the TF-IDF value may be offset by the frequency of the word in the corpus, which may compensate for frequent appearance of some words.

Further, the LSI technique relates to natural language processing, in particular, to distributional semantics, of analyzing relationships between a set of documents and associated terms, by producing a set of concepts related to the documents and the corresponding terms. The basic premise of application of LSI is that words having similar meanings occur in similar portions of text. Therefore, words in a cluster tend to be semantically similar.

Therefore, by using the IF-IDF technique, the system 102 may determine important words in the plurality of sentences. Subsequently, the system 102 may generate concepts by using the LSI technique, in which similar words are represented in similar concept. Further, the categorizer 204 may generate the first set of clusters by using the K-Means clustering technique. Therefore, the first of clusters may include words that are semantically similar and are used in similar context.

Subsequently, the categorizer 504 may categorize the plurality of words into a second set of clusters by using a second clustering technique. In an example embodiment, the second clustering technique may include, but is not limited to, a Conditional Random Field (CRF) technique.

While the first clustering technique focuses at a word level, the second clustering technique may focus on the semantically similarity of pair of sentences. The second clustering technique may compare two sentences and may determine similarities accordingly. Therefore, in an example embodiment, the second clustering technique may categorize the set of sentences into multiple clusters based on similarities among them.

In an example embodiment, the first clustering technique and the second clustering technique form the first set of clusters and the second set of clusters, respectively, based on similarities in at least one of spellings, pronunciations, and meanings of the plurality of words.

In an example embodiment, in the first clustering technique, i.e., the K-means clustering technique, the categorizer 504 may normalize the sentence by removing words, such as "us", "are", "the", "they", "is", and "them". The categorizer 504 may remove the words that may not contribute much to the meaning of the sentence and, therefore, can be excluded from the sentence.

Further, the categorizer 504 may select features of the sentence by identifying words that are critical with respect to the meaning of the sentence. For example, the categorizer 504 may use the TF-IDF technique for selecting the features.

Further, the categorizer 504 may select the features, based on a length of a words and pre-tagging of the word. For example, in an example embodiment, when the word is "New York", the categorizer 504 may tag the word as a city based on a lookup of a thesaurus. Therefore, the categorizer 504 may tag all such words as cities.

Further, the categorizer 504 may convert the words in a simple mathematical form by using the LSI technique for example. Once the mathematical form of the words is defined, the categorizer 504 may use the K-means clustering technique, for example, to group or create boundaries between a set of data points. Therefore, the K-means clustering technique may identify the similarity between the words using analytical analysis by focusing on words that are important to the meaning of the sentence.

In an example embodiment, the second clustering technique, i.e., the CRF technique is applied based on sentence similarity. Therefore, in this technique, the categorizer 504 may identify the similarities between two sentences. After identification of the similarities and grouping of similar sentences, the categorizer 504 may detect common words in each group and create clusters of words accordingly.

In an example embodiment, the categorizer 504 may use spacy similarity technique for identifying similarity between two sentences. In the spacy similarity technique, the categorizer 504 may use an average-of-vectors methodology based on pre-trained vectors to match the similarity.

Following the categorization of the plurality of words, the detector 506 may detect words that appear in similar clusters by the first clustering technique and the second clustering technique. In an example embodiment, similarity of clusters may be, based on nature of words forming the clusters.

Based on the detection, the generator 508 may generate a confidence score for each of the plurality of words based on the detection. The confidence score of a word is indicative of accuracy of the categorization of the word. In an example embodiment, the confidence score may be generated on a scale of 1 to 100.

In an example embodiment with 1000 sentences, the system 102 may use the first clustering technique to create 7 clusters of words from the 1000 sentences, namely, A1, A2, A3, A4, A5, A6, and A7. Further, the system 102 may use the second clustering technique to create 5 clusters of words, namely, B1, B2, B3, B4, and B5. Both the set of clusters are created from same sentences and therefore, constitute same words. In an example embodiment, similar words may be present in same clusters. For example, the cluster A1 and the cluster B3 may include common words. Similarly, the cluster A3 and the cluster B5 may include common words. The system 102 may generate a map indicating such relationship between the clusters formed by the first clustering technique and the clusters formed by the second clustering technique. In an example embodiment, the map may be used for determining similarity between the clusters.

In an example embodiment, once the first set of clusters and the second set of clusters are formed, and the confidence scores are generated, the system 102 may regulate the interaction between the virtual assistant 104 and the user 106. The receiver 502 may receive at least one instruction from the user 106 in form of a sentence. The at least one instruction may be received through at least one of an e-mail 204, a chat message 202, the web service 206, and the IVR 206.

Further, the detector 506 may detect a word from the sentence that is not understandable to the system 102. The system 102 may further include a determinator 510, a selector 512, a replacer 514, a transmitter 516, a checker 518, and a learner 520. In an example embodiment, the receiver 502, the detector 506, the determinator 510, the selector 512, the replacer 514, the transmitter 516, the checker 518, and the learner 520 may be in communication with each other.

The determinator 510 may determine a cluster of words, from among the first set of clusters and the second set of clusters, that relates to the detected word. In an example embodiment, the first set of clusters and the second set of clusters may be understood as predefined clusters of words that are formed by categorization of the plurality of words based on similarities in at least one of the spellings, pronunciations, and meanings of the plurality of words.

Further, the selector 512 may select at least one word from the cluster that relates to the detected word, based on a confidence score of the at least one word. The replacer 514 may then replace the word with the at least one word to form a new sentence. The new sentence may be transmitted to the user 106 by the transmitter 516 for confirmation of accuracy of the new sentence.

In another example embodiment, when the determinator 510 may not determine the cluster of words that relates to the detected word. In such an example embodiment, the transmitter 516 may transmit the sentence to an administrator. Subsequently, the receiver 502 may receive an input from the administrator to understand the sentence.

Further, in an example embodiment, before transmitting the new sentence to the user 106, the determinator 510 may determine whether an intent and entities of the new sentence are detectable. The determinator 510 may determine the intent and the entities, based on text and structure of the new sentence.

Figure 6:
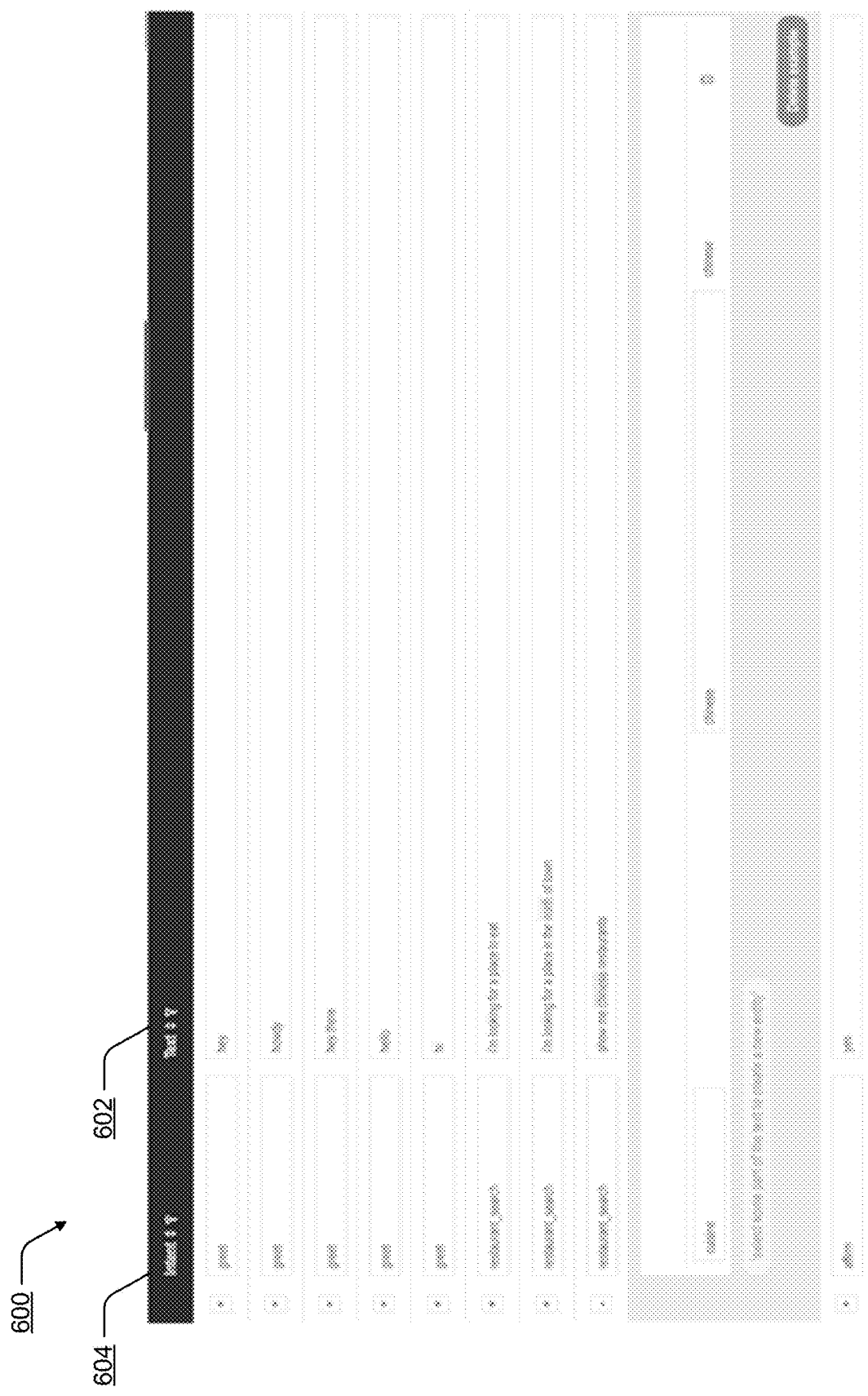
FIG. 6 illustrates an interface depicting determination of intent and entities in sentences by the system, according to an example embodiment of the present disclosure.

FIG. 6 illustrates an interface 600 depicting determination of the intent and the entities in sentences by the system 102, according to an example embodiment of the present disclosure. As shown, phrases in a right column 602 indicate sentences, terms in a left column 604 indicate corresponding intent of a sentence, and entities are indicated in a highlight. For example, for a sentence "I am looking for a place in the north of town", the system 102 may determine the intent as "restaurant search" and the entity as "north".

Referring back to FIG. 5, when it is determined that the intent and the entities are detectable; the transmitter 516 may transmit the new sentence to the user 106 for the confirmation. Based on the confirmation, the transmitter 516 may interact with the user 106 in response to the new sentence.

The learner 520 may be in communication with the transmitter 516, and may categorize the detected word in the cluster of words that relate to the detected word, based on the confirmation. Further, in an example embodiment, the checker 518 may be in communication with the receiver 502 and the detector 506 to check whether a proportion of length of the sentence that is understandable by the system 102 is more than a predefined threshold proportion. The sentence is indicative of a request or a sentence said by the user 106. For example, the system 102 may define the predefined threshold proportion as 85 percent of the sentence. Therefore, the checker 518 may check whether at least 85 percent of the sentence is understandable by the system 102. In an example embodiment, when the proportion of the sentence that is understandable by the system 102 is more than the predefined threshold proportion, the transmitter 516 may interact with the user in response to the sentence.

In another example embodiment, when the checker 518 determines that the proportion of the sentence that is understandable by the system is less than the predefined threshold proportion, the detector 506 may detect the word from the sentence that is not understandable. Subsequently, the system 102 may proceed as explained earlier.

In one example, the system 102 may generate the set of clusters A, B, and C by using the first clustering technique and the second set of cluster D, E, F, G, and H by using the second clustering technique. The system 102 may further map the first set of clusters with the second set of clusters. In one example, the cluster A may be mapped with the cluster D, based on similarities. Similarly, the cluster H and the cluster B are similar to the cluster E. The system 102 may map the clusters based on common words occurring in the clusters.

Further, for a sentence that is not understood by the virtual assistant 104, the system 102 may identify the clusters for the sentence by using both the techniques. For example, for a sentence "I want some burger", the system 102 may determine that the sentence maps to the cluster B and the cluster 2 by the first clustering technique and the second clustering technique, respectively.

As mentioned previously, the cluster B and the cluster E are mapped to each other by the system 102. Therefore, the confidence score generated by the system 102 may accordingly be high. For each unmatched word in the sentence, the system 102 may identify top semantic word matches or alternative from the detected clusters. The system 102 may then generate alternate phrases or sentences by replacing an unmatched word with alternate words in various combinations. Each new sentence so formed may then be checked for the intent and the entities. When the system 102 determines that the virtual assistant 104 understands the new sentence and can extract the intent and the entities, the new sentence may be transmitted to the user 106 for confirmation of accuracy of the new sentence. Upon receiving the confirmation, the new sentence may be stored in the database 214 for subsequent purposes.

Figure 7:
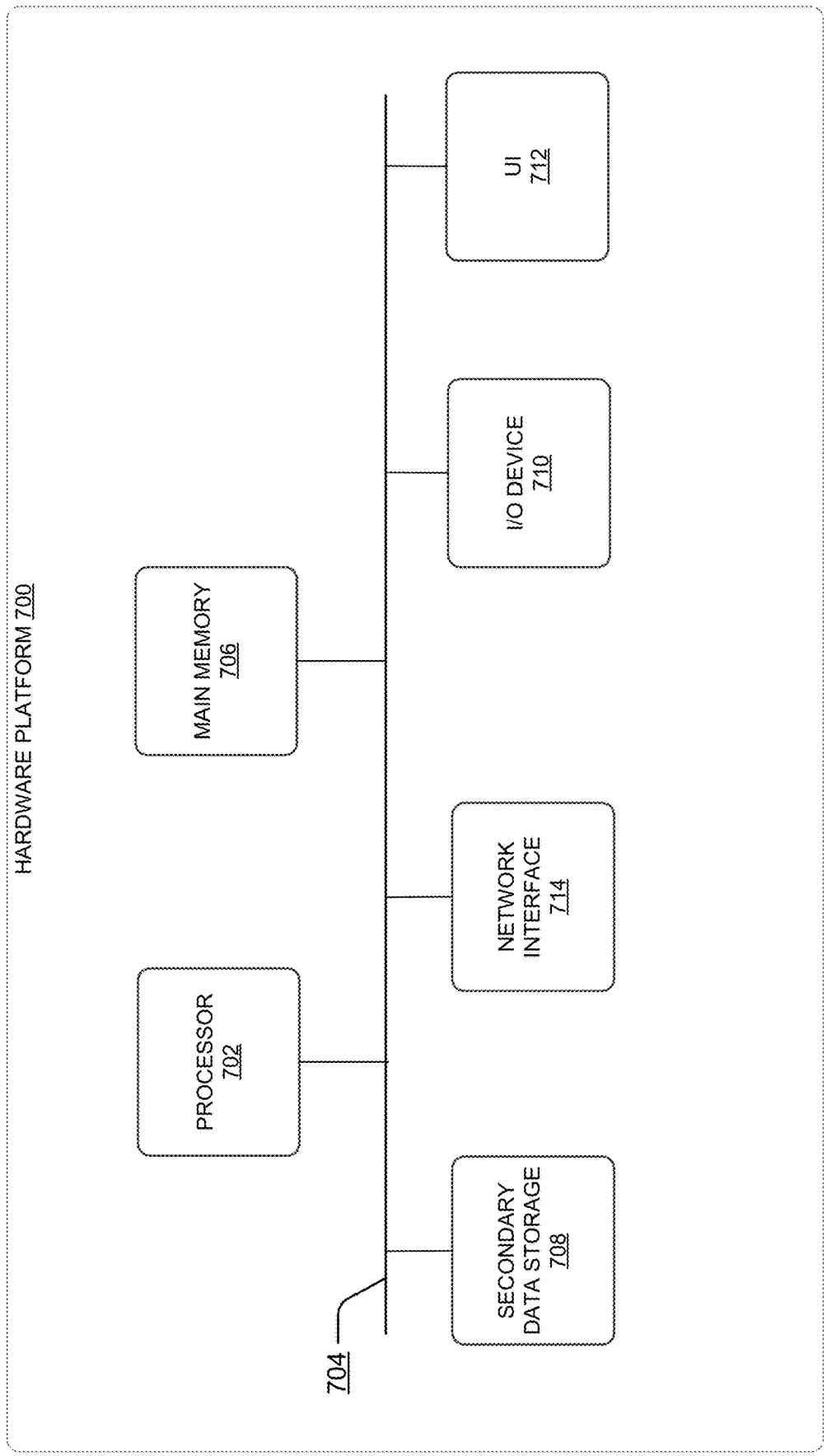
FIG. 7 illustrates a hardware platform for implementation of the system, according to an example of the present disclosure.

FIG. 7 illustrates a hardware platform 700 for implementation of the system 102, according to an example of the present disclosure. In an example embodiment, the hardware platform 700 may be a computer system 700 that may be used with the examples described herein. The computer system 700 may represent a computational platform that includes components that may be in a server or another computer system. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 700 may include a processor 702 that may implement or execute machine readable instructions performing some or all of the methods, functions, techniques and/or other processes described herein. Commands and data from the processor 702 may be communicated over a communication bus 704. The computer system 700 may also include a main memory 706, such as a random access memory (RAM), where the machine readable instructions and data for the processor 702 may reside during runtime, and a secondary data storage 708, which may be non-volatile and stores machine readable instructions and data. The memory 706 and data storage 708 are examples of non-transitory computer readable mediums. The memory 706 and/or the secondary data storage may store data used by the system 102, such as an object repository including web objects, configuration data, test data, etc.

The computer system 700 may include an Input/Output (I/O) device 710, such as a keyboard, a mouse, a display, etc. A user interface (UI) 712 can be a communication device that provides textual and graphical user interfaces to the user 116 of the system 102. The UI 712 may operate with I/O device 710 to accept from and provide data to a user. The computer system 700 may include a network interface 714 for connecting to a network. Other known electronic components may be added or substituted in the computer system. The processor 702 may be designated as a hardware processor. The processor 702 may execute various components of the system 102 described above and perform the methods described below.

Figure 8:
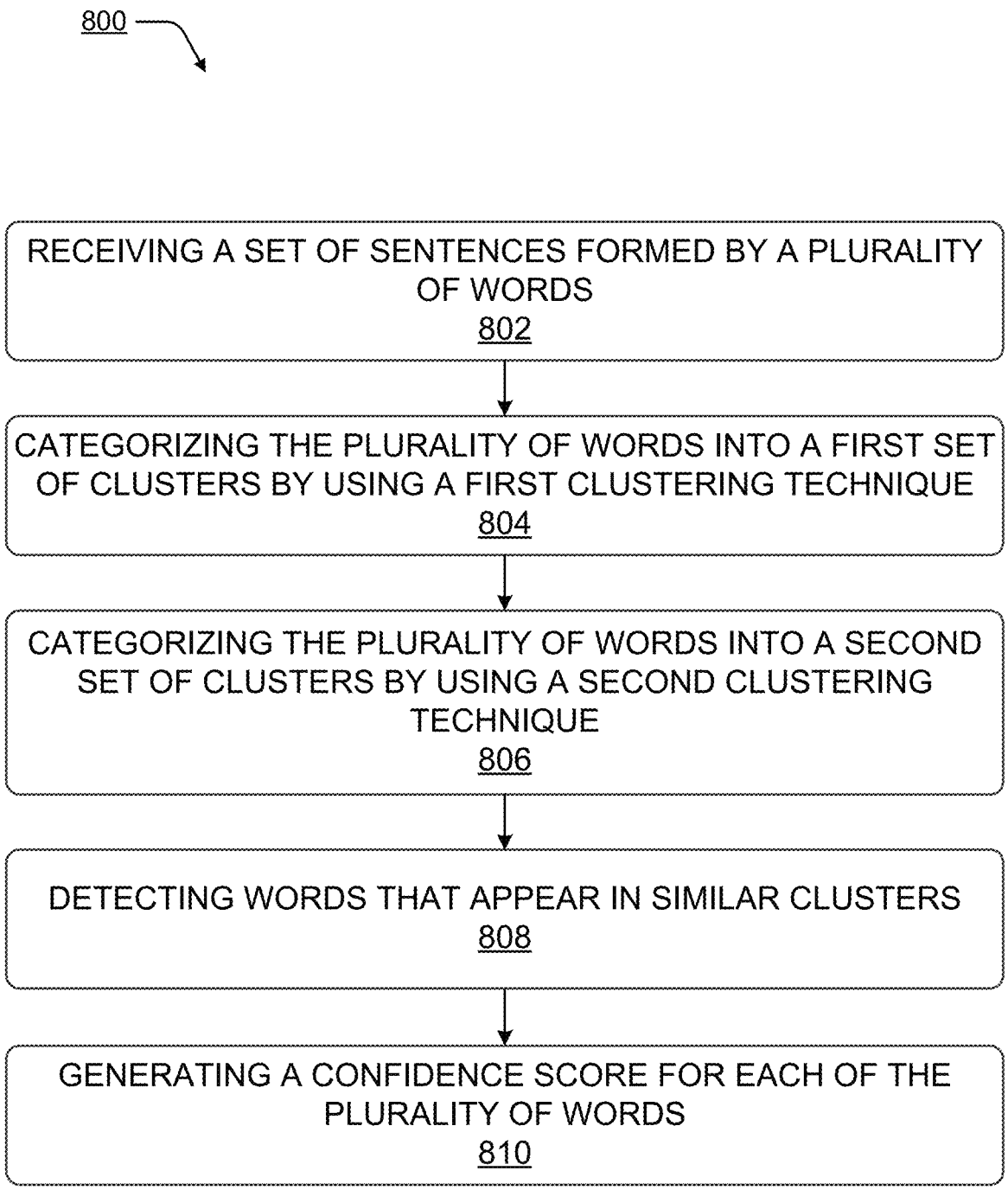
FIG. 8 illustrates a computer-implemented method for categorizing words into clusters, according to an example embodiment of the present disclosure.

FIG. 8 illustrates a computer-implemented method 800 for categorizing words into clusters, according to an example embodiment of the present disclosure. The computer-implemented method 800, hereinafter referred to as method 800, may be executed by at least one processor 702. For the sake of brevity, construction and operational features of the system 102 which are already explained in detail in the description of FIG. 1, FIG. 2, FIG. 3, FIG. 4, FIG. 5, FIG. 6, and FIG. 7 are not explained in detail in the description of FIG. 8.

At 802, the method 800 commences with receiving the set of sentences formed by the plurality of words. The set of sentences is indicative of interaction of the user 106 with the virtual assistant 104. The user 106 may interact with the virtual assistant 104 through at least one of the e-mails 204, the chat messages 202, the web service 206, and the IVR 206. In an example embodiment, the receiver 502 of the system 102 may receive the set of sentences formed by the plurality of words.

At 804, the method 800 includes categorizing the plurality of words into the first set of clusters by using the first clustering technique. In an example embodiment, the categorizer 504 of the system 102 may categorize the plurality of words into the first set of clusters.

At 806, the method 800 includes categorizing the plurality of words into the second set of clusters by using the second clustering technique. The first clustering technique and the second clustering technique may form the first set of clusters and the second set of clusters, respectively, based on similarities in at least one of the spellings, the pronunciations, and the meanings of the plurality of words. In an example embodiment, the categorizer 504 of the system 102 may categorize the plurality of words into the second set of clusters.

At 808, the method 800 includes detecting the words that appear in similar clusters after categorization by the first clustering technique and the second clustering technique. In an example embodiment, similarity of clusters may be determined based on the nature of words forming the clusters. In an example embodiment, the detector 506 of the system 102 may detect the words that appear in the similar clusters At 810, the method 800 includes generating a confidence score for each of the plurality of words based on the detection. The confidence score of a word is indicative of accuracy of the categorization of the word. In an example embodiment, the generator 508 of the system 102 generates the confidence scores of the plurality of words.

In an example embodiment, after the categorization and generation, the method 800 may include receiving the at least one instruction from the user 106 in form of a sentence. The at least one instruction may be received through at least one of the e-mail 204, the chat message 202, the web service 206, and the IVR 206. Further, a word from the sentence may be detected that is not understandable to the system 102.

The method 800 may then determine the cluster of words, from among the first set of clusters and the second set of clusters, that relates to the detected word. At least one word from the cluster may be selected that relates to the detected word. The at least one word may be selected based on the confidence score of the at least one word. The word may then be replaced with the at least one word to form the new sentence which may be transmitted to the user 106 for confirmation of accuracy of the new sentence. Based on the confirmation, the system 102 may interact with the user 106 in response to the new sentence.

In an example embodiment, before transmitting the new sentence to the user 106, the method 800 may include determining whether the intent and the entities of the new sentence are detectable. The intent and the entities may be determined based on the text and the structure of the new sentence. When the intent and the entities are determined to be detectable, the method 800 may then transmit the new sentence to the user 106 for the confirmation.

In an example embodiment, the method 800 may include categorizing the detected word in the cluster of words that relate to the detected word, based on the confirmation from the user 106. In an example embodiment, the method 800 may include checking whether the proportion of length of the sentence that is understandable by the system 102 is more than the predefined threshold proportion. When the proportion of the sentence that is understandable is more than the predefined threshold proportion, the system 102 may interact with the user 106 in response to the sentence.

Figure 9:
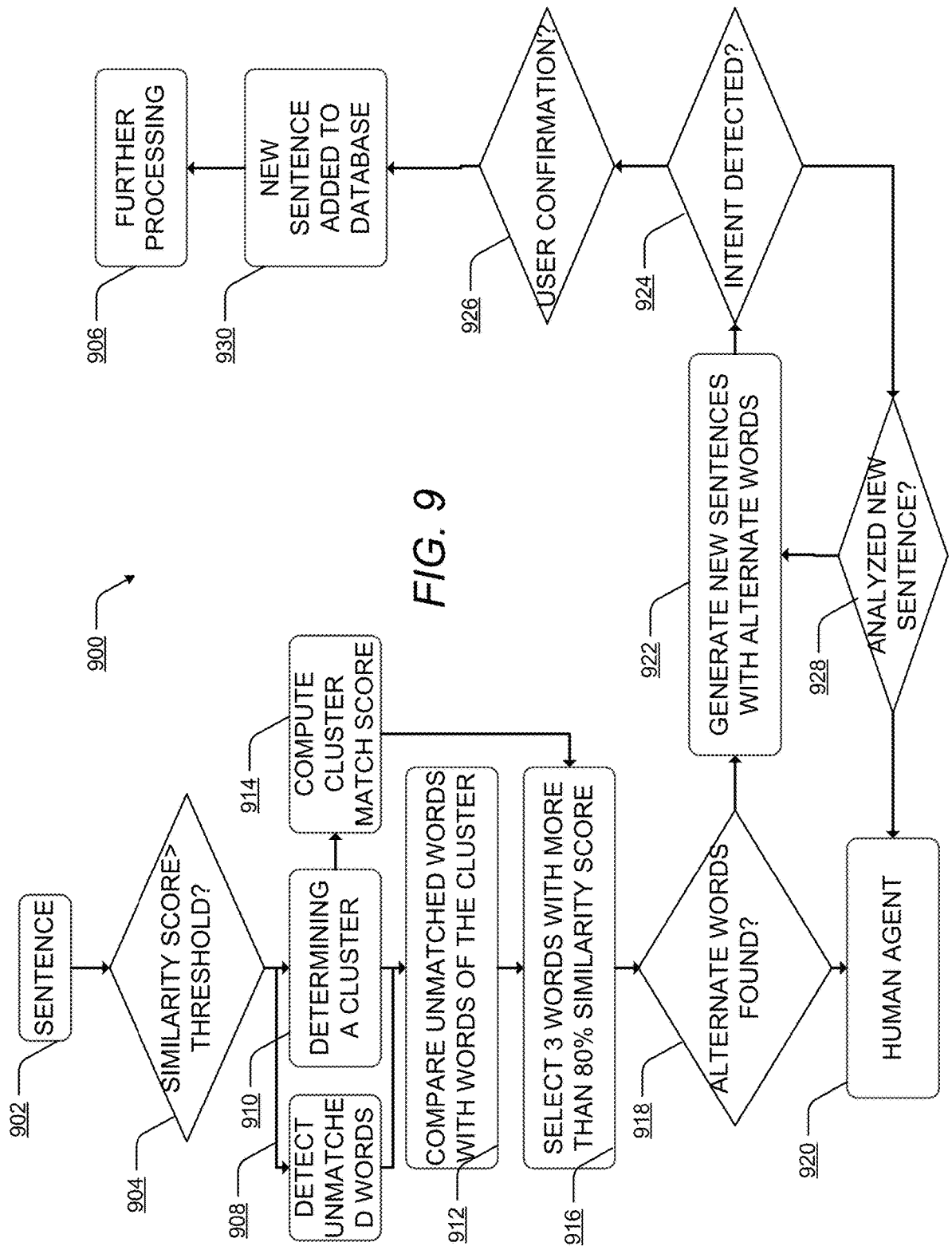
FIG. 9 illustrates a computer-implemented method for the interaction between the virtual assistant and the user, according to an example embodiment of the present disclosure.

FIG. 9 illustrates a computer-implemented method 800 for assisting the interaction between the virtual assistant 104 and the user 106, according to an example embodiment of the present disclosure. The computer-implemented method 900, hereinafter referred to as method 900, may be executed by at least one processor 702. For the sake of brevity, construction and operational features of the system 102 which are already explained in detail in the description of FIG. 1, FIG. 2, FIG. 3, FIG. 4, FIG. 5, FIG. 6, FIG. 7, and FIG. 8 are not explained in detail in the description of FIG. 9.

At 902, the method 900 commences with receiving a sentence from the user 106. At 904, the method 900 includes determining whether the sentence has a similarity score of more than a predefined threshold value. The similarity score is indicative of understandability of the sentence by the system 102.

In an example embodiment, the predefined threshold value may be 85 percent. In an example embodiment, the similarity score is determined to be more than the predefined threshold value. In such an embodiment, the method 900 branches to 906 where the sentence is forwarded for further processing. In an alternate example embodiment, it is determined that the similarity score is less than the predefined threshold value. In such an example embodiment, the method 900 branches to 908. At 908, words that are not understood by the system 102, also referred to as unmatched words, are detected. At 910, the method 900 includes determining a cluster of words that is close to the unmatched words. At 912, each unmatched word is compared with words of the determined cluster for similarity. At 914, a cluster match score is determined. Based on the cluster match score and the comparison, at 916, the method 900 includes selecting 3 words from the cluster that are closest to each unmatched word and have a similarity score of more than 80 percent.

At 918, it is determined whether alternate words are detected for each unmatched word of the sentence. In an example embodiment, it is determined that the alternate words are not determined for each unmatched word. In such an example embodiment, at 920, the method 900 includes forwarding the sentence to the administrator or a human agent as the system 102 does not understand the sentence. In an alternate example embodiment, when the alternate words are determined for each unmatched word of the sentence, at 922, each alternate word is replaced with a corresponding alternate word in the sentence and therefore, a new sentence is generated.

At 924, the intent and the entities of the new sentence are determined. In an example embodiment, the intent and the entities of the new sentence are determined. In such an example embodiment, at 926, the new sentence is forwarded to the user 106 for confirmation. When the intent and the entities are not determined, at 928, it is determined whether the new sentence is analyzed. When the new sentence is not analyzed, the method 900 branches back to 924. When the new sentence is analyzed, the method 900 branches back to 920.

At 926, when the user 106 declines the new sentence, the method 900 branches back to 928. In an example embodiment, when the user 106 confirms the accuracy of the new sentence, at 930, the new sentence is added to the database 214. The method 900 then branches to 906 for further processing of the new sentence.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system for categorizing words into clusters, the system comprising:
   a receiver to:
      receive a set of sentences formed by a plurality of words, the set of sentences being indicative of interaction of a user with a virtual assistant, wherein the user interacts with the virtual assistant through at least one of e-mails, chat messages, a web service, and an Interactive Voice Response (IVR); and
      receive an instruction from the user in form of a sentence;
   a categorizer in communication with the receiver to:
      categorize the plurality of words into a first set of clusters by using a first clustering technique; and
      categorize the plurality of words into a second set of clusters by using a second clustering technique,
      wherein the first clustering technique and the second clustering technique form the first set of clusters and the second set of clusters, respectively, based on similarities in at least one of spellings, pronunciations, and meanings of the plurality of words;
   a detector in communication with the categorizer to:
   detect words that appear in similar clusters after categorization by the first clustering technique and the second clustering technique, wherein similarity of clusters is based on nature of words forming the clusters; and
   detect a word from the sentence that is not understandable to the system, when a proportion of a length of the sentence understandable by the system is less than a predefined threshold proportion; and
   a generator in communication with the detector to generate a confidence score for each of the plurality of words based on the detection, wherein the confidence score of a word is indicative of accuracy of the categorization of the word.

2. The system of claim 1 further comprising:
   a determinator in communication with the detector to determine a cluster of words, from among the first set of clusters and the second set of clusters, that relates to the detected word;
   a selector in communication with the determinator to select at least one word from the cluster that relates to the detected word, based on the confidence score of the at least one word;
   a replacer in communication with the selector to replace the word with the at least one word to form a new sentence; and
   a transmitter in communication with the replacer to:
      transmit the new sentence to the user for confirmation of accuracy of the new sentence; and
      interact with the user in response to the new sentence, based on the confirmation.

3. The system of claim 2, further comprising a learner in communication with the transmitter to categorize the detected word in the cluster of words that relate to the detected word, based on the confirmation.

4. The system of claim 2 further comprising:
   the determinator to determine whether an intent and entities of the new sentence are detectable, based on text and structure of the new sentence; and
   the transmitter in communication with the determinator to transmit the new sentence to the user for the confirmation, when the intent and the entities are determined to be detectable.

5. The system of claim 2 further comprising:
   a checker in communication with the receiver and the detector to check
   whether the proportion of length of the sentence that is understandable by the system is more than the predefined threshold proportion; and
   the transmitter in communication with the checker to interact with the user in response to the sentence, when the proportion of the sentence that is understandable by the system is more than the predefined threshold proportion.

6. The system of claim 2 further comprising the transmitter to transmit the sentence to an administrator, when the cluster of words that relates to the detected word is not determined.

7. The system of claim 1, wherein the first clustering technique is K-means clustering technique and the second clustering technique is Conditional Random Field (CRF) technique.

8. The system of claim 7, wherein the CRF technique is applied based on sentence similarity.

9. A system for assisting an interaction between a virtual assistant and a user, the system comprising:
   a receiver to:
      receive at least one instruction from the user in form of a sentence, wherein the at least one instruction is received through at least one of an e-mail, an chat message, a web service, and an Interactive Voice Response (IVR); and receive an instruction from the user in form of a sentence;

a detector in communication with the receiver to detect a word from the sentence that is not understandable to the system, when a proportion of a length of the sentence understandable by the system is less than a predefined threshold proportion;

a determinator in communication with the detector to determine a cluster of words, from among predefined clusters of words, that relates to the detected word, wherein the predefined clusters of words are formed by categorization of a plurality of words based on similarities in at least one of spellings, pronunciations, and meanings of the plurality of words;

a selector in communication with the determinator to select at least one word from the cluster that relates to the detected word, based on a confidence score of the at least one word, wherein a confidence score of a word is indicative of accuracy of the categorization of the word;

a replacer in communication with the selector to replace the word with the at least one word to form a new sentence; and a transmitter in communication with the replacer to:
  transmit the new sentence to the user for confirmation of accuracy of the new sentence; and
  interact with the user in response to the new sentence, based on the confirmation.

10. The system of claim 9, further comprising a learner in communication with the transmitter to categorize the detected word in the cluster of words that relate to the detected word, based on the confirmation.

11. The system of claim 9 further comprising:
the determinator to determine whether an intent and entities of the new sentence are detectable, based on text and structure of the new sentence; and
the transmitter in communication with the determinator to transmit the new sentence to the user for the confirmation, when the intent and the entities are determined to be detectable.

12. The system of claim 9 further comprising:
a checker in communication with the receiver and the detector to check
whether the proportion of length of the sentence that is understandable by the system is more than the predefined threshold proportion; and
the transmitter in communication with the checker to interact with the user in response to the sentence, when the proportion of the sentence that is understandable by the system is more than the predefined threshold proportion.

13. The system of claim 9 further comprising the transmitter to transmit the sentence to an administrator, when the cluster of words that relates to the detected word is not determined.

14. A computer-implemented method, for categorizing words into clusters, executed by at least one processor, the method comprising:
receiving a set of sentences formed by a plurality of words, the set of sentences being indicative of interaction of a user with a virtual assistant, wherein the user interacts with the virtual assistant through at least one of e-mails, chat messages, a web service, and an Interactive Voice Response (IVR);
receiving an instruction from the user in form of a sentence;
categorizing the plurality of words into a first set of clusters by using a first clustering technique;
categorizing the plurality of words into a second set of clusters by using a second clustering technique, wherein the first clustering technique and the second clustering technique form the first set of clusters and the second set of clusters, respectively, based on similarities in at least one of spellings, pronunciations, and meanings of the plurality of words;
detecting words that appear in similar clusters after categorization by the first clustering technique and the second clustering technique, wherein similarity of clusters is based on nature of words forming the clusters;
detecting a word from the sentence that is not understandable to the system, when a proportion of a length of the sentence understandable by the system is less than a predefined threshold proportion; and
generating a confidence score for each of the plurality of words based on the detection, wherein the confidence score of a word is indicative of accuracy of the categorization of the word.

15. The method of claim 14 further comprising:
determining a cluster of words, from among the first set of clusters and the second set of clusters, that relates to the detected word;
selecting at least one word from the cluster that relates to the detected word, based on the confidence score of the at least one word;
replacing the word with the at least one word to form a new sentence;
transmitting the new sentence to the user for confirmation of accuracy of the new sentence; and
interacting with the user in response to the new sentence, based on the confirmation.

16. The method of claim 15 further comprising categorizing the detected word in the cluster of words that relate to the detected word, based on the confirmation.

17. The method of claim 15 further comprising:
determining whether an intent and entities of the new sentence are detectable, based on text and structure of the new sentence; and
transmitting the new sentence to the user for the confirmation, when the intent and the entities are determined to be detectable.

18. The method of claim 15 further comprising:
checking whether the proportion of length of the sentence that is understandable by the system is more than the predefined threshold proportion; and
interacting with the user in response to the sentence, when the proportion of the sentence that is understandable by the system is more than the predefined threshold proportion.

* * * * *